(12) United States Patent
Maximilien et al.

(10) Patent No.: US 8,595,696 B2
(45) Date of Patent: Nov. 26, 2013

(54) DEVELOPMENT OF NETWORKED APPLICATIONS

(75) Inventors: E. Michael Maximilien, San Jose, CA (US); Ajith Ranabahu, Fairborn, OH (US); Stefan Tai, Pleasantville, NY (US)

(73) Assignee: International Business Machines Corporation, Armonk, NY (US)

( * ) Notice: Subject to any disclaimer, the term of this patent is extended or adjusted under 35 U.S.C. 154(b) by 1187 days.

(21) Appl. No.: 12/241,427

(22) Filed: Sep. 30, 2008

(65) Prior Publication Data

US 2010/0083222 A1    Apr. 1, 2010

(51) Int. Cl.
    G06F 9/44    (2006.01)
(52) U.S. Cl.
    USPC .......................................... 717/110; 717/114
(58) Field of Classification Search
    USPC .................................. 717/101–119
    See application file for complete search history.

(56) References Cited

U.S. PATENT DOCUMENTS

| | | | |
|---|---|---|---|
| 6,195,685 B1 | 2/2001 | Mukherjee et al. |
| 6,671,721 B1 | 12/2003 | Branson et al. |
| 6,792,454 B2 | 9/2004 | Nakano et al. |
| 6,854,120 B1 | 2/2005 | Lo et al. |
| 7,146,615 B1 | 12/2006 | Hervet et al. |
| 7,165,060 B2 | 1/2007 | Foster et al. |
| 7,269,792 B2 | 9/2007 | Consolatti et al. |
| 2002/0101448 A1 | 8/2002 | Sanderson |
| 2003/0176998 A1 | 9/2003 | Walker |
| 2004/0088713 A1 | 5/2004 | Myllymaki et al. |
| 2005/0071801 A1 | 3/2005 | Jesse et al. |
| 2006/0184826 A1 | 8/2006 | Argo et al. |
| 2006/0236311 A1 | 10/2006 | Chang et al. |
| 2007/0078953 A1 | 4/2007 | Chai et al. |
| 2007/0118634 A1 | 5/2007 | Chan et al. |
| 2007/0136658 A1 | 6/2007 | Feigenbaum et al. |
| 2007/0157167 A1 | 7/2007 | Brendle et al. |
| 2008/0222572 A1* | 9/2008 | Nathan et al. ................. 715/855 |
| 2010/0083287 A1* | 4/2010 | Maximilien et al. .......... 719/328 |

OTHER PUBLICATIONS

Hartmann et al., "Programming by a Sample: Rapidly Creating Web Applications with d.mix", Oct. 2007, ACM, pp. 241-250.*
Malicinski et al., "Measuring Web traffic, Part 2—Monitoring traffic through HTTP server log analysis", Mar. 2001, http://www.ibm.com/developerworks/web/library/wa-mwt2/, 12 pages.*
Akash Mehta, "Whip Up a Yahoo! Mashup Using PHP", Aug. 2007, http://www.sitepoint.com/yahoo-mashup-php/, 11 pages.*

(Continued)

Primary Examiner — Ted T Vo
(74) Attorney, Agent, or Firm — Daniel E. Johnson; Ryan, Mason & Lewis, LLP

(57) ABSTRACT

Mashup creation, through the reuse and combination of existing networking or Web applications, are presented. For example, a method for forming a networked software application on a first computer resource coupled by a network to a client computer of a user includes accessing, within a repository that is part of the first computer resource, a first networked software application part, forming, within the first computer resource, a second networked software application part, and providing the second networked software application part to the repository. The second networked software application part comprises a first element of the first networked software application part. The steps of accessing, forming and providing are performed using the first computer resource comprising the repository. The first and the second networked software application parts remain on the first computer resource, and separate from the client computer, during the forming of the second networked software application part.

24 Claims, 6 Drawing Sheets

(56) References Cited

OTHER PUBLICATIONS

E.M. Maximilien et al., "A Domain-Specific Language for Web APIs and Services Mashups," Proc. of the 5th Intl. Conf. on Service-Oriented Computing (ICSOC), Sep. 2007,pp. 13-26, Austria.

S. Rosenberg, "Anything You Can Do, I Can Do Meta," MIT Technology Review, Jan. 2007, 22 pages.

C. Simonyi et al., "Intentional Software," Procs. of the ACM Conference on Object-Oriented Programming Systems Languages Applications (OOPSLA), Oct. 2006, 13 pages, Oregon.

T. O'Reilly, "What is Web 2.0: Design Patterns and Business Models for the Next Generation of Software," www.oreillynet.com, Sep. 2005, 16 pages.

A. Van Deursen et al., "Domain-Specific Languages: An Annotated Bibliography," SIGPLAN Not. 2000, 22 pages, vol. 35, No. 6.

D.P. Casal, "Advanced Software Development for Web Applications," JISC Technology and Standards Watch, 2005, pp. 1-23.

R.T. Fielding, "Software Architectural Styles for Network-Based Applications,". Ph.D. thesis, University of California, Jan. 2000, http://www.ics.uci.edu/~fielding/pubs/dissertation/top.htm, California.

F. Curbera et al., "Business Process Execution Language for Web Services," version 1.1, 2002, http://www-128.ibm.com/developerworks/library/specification/ws-bpel/, 1 page.

S. Tai et al., "Service Communities: Applications and Middleware," Procs. of the 6th International Workshop on Software Engineering and Middleware (SEM-06), 2006, 6 pages, Oregon.

E.M. Maximilien et al., "An Online Platform for Web APIs and Service Mashups," IEEE Internet Computing, Sep./Oct. 2008, pp. 32-43, vol. 12, No. 5.

E. Michael Maximilien et al., "Swashup: Situational Web Applications Mashups," Companion to the 22nd ACM SIGPLAN Conference on Object Oriented Programming Systems and Applications (OOPSLA), 2007, pp. 797-798, Canada.

R. Gopal,"Unifying Network Configuration and Service Assurance with a Service Modeling Language," Network Operations and Management Symposium (NOMS), IEEE/IFIP, Apr. 2002, pp. 711-725.

M. Kline, "Business Process Framework," RD n429 Jan. 2000 Article 1, 5 pages.

\* cited by examiner

Primary Constructs

| Construct | Description | Example |
|---|---|---|
| data | Describe a data element used in a service. A data element can corresponds to an XML schema complex type or JSON type. Each data element has a name and a series of member attributes. These attributes' types can be simple type or other data elements. Caching is enabled using cache :policy-name. | data : Error do<br>  name : error<br>  member : code, : string, : attribute,<br>    : desc → 'description', : tag → 'err'<br>  cache : fifo<br>end |
| api | Gives a complete description of a service's interface. This includes descriptions for the service's API, including operation names, parameters, and data types as well as HTTP verb and header. An operation's data is either a simple type (e.g., string or integer) or refers to a data element. | api : DiggApi do<br>  desc "All stories"<br>  api_method : stories, : http_method → : get,<br>    : http_header → 'Accept : text/xml'<br>...<br>end |
| service | Binds a service api with a concrete service. Part of the binding is to indicate the service's type (e.g., REST, RSS, Atom, or AtomPub), the service's endpoint, as well as give an alias for the service instance. | service : digg_rest_service , : type → : rest ,<br>  : api → : DiggApi , : alias → : digg ,<br>  : endpoint → 'http :// services , digg . com' |
| mashup | A composition of one or multiple services. It comprises a collection of wiring declarations. Each mashup translates into a composed service which may be exposed externally and used for further mashups. | mashup : digg_cnn_mashup do | digg , cnn |<br>  # wirings<br>end |
| mediation | Invokes a mediation declaration with instances of the data elements to mediate. The result of a mediate call is a primitive type instance or another data element instance. | mediation flickr_2_youtube do | fdata , ydata |<br>...<br>end |
| wiring | Interaction with the users. Can include invocation to services' operations via available callbacks. Additionally, when service data caching is enable, a wiring can make use of the cached data instead of actually performing a remote operation call by using SQL statements. | wiring : interesting_photos do<br>  # calls to step methods<br>end |

Primary Constructs

| Construct | Description | Example |
|---|---|---|
| Step (protocol mediation Step) | Constitutes one atomic step in wiring. A step can be invoked multiple times as part of a wiring. A step is invoked by the step's name like a method call. | step :combine_feeds do \| stanford , ibm_w3_media ... end |
| view | Describes a view component of the mashup. Usually written in RHTML (HTML augmented with Ruby code) | view :view_feed , :mashups → [ : feeds_mashup ], :content → %{ # RHTML views } end |
| css | Contains the cascading style sheets for the mashup | css :default , :mashups → [ : eventful_mashup ], :content → %{ # CSS declarations } end |
| recipe | Top level container for all other DSL constructs | recipe :eventful_digg_recipe do # all other DSL constructs end |
| desc | Allows users to provide English text descriptions to any DSL parts. The text is indexed to enable searching. | desc "Flickr photo data" |
| tag, tags | Allows users to annotate terms to the various components of a Sharable Code _recipe_. These types of tagging allows for some level of comments and idiosyncratic semantics to the various components | tags [ 'errors', 'api_error' ] tag 'rest' |

210   220   230

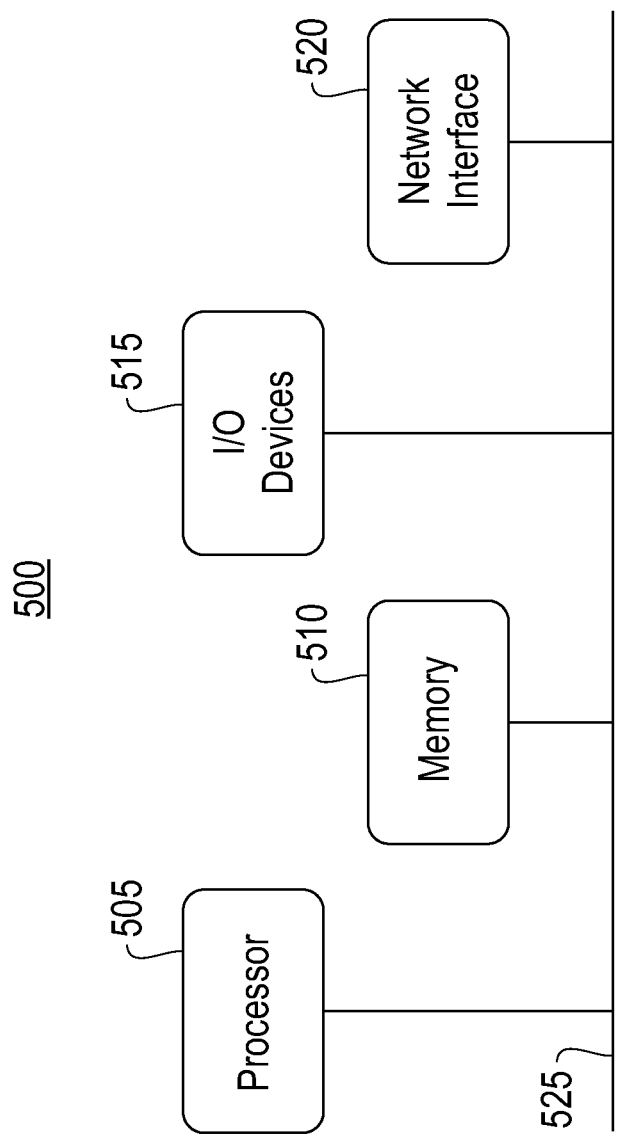

DEVELOPMENT OF NETWORKED APPLICATIONS

CROSS REFERENCE TO RELATED PATENT APPLICATION

The present application is related to the U.S. patent application identified as Attorney Docket No. ARC920080050US1 entitled "Declarative Representation of Networked Applications," filed concurrently herewith, the disclosure of which is incorporated by reference herein.

FIELD OF THE INVENTION

The present invention relates generally to the creation of networked or Web applications, and more particularly the invention relates to reusing and combining existing networked and Web applications to efficiently forming new networked and Web applications.

BACKGROUND OF THE INVENTION

The Web is now programmable. The availability of Web data in the form of structured extensible markup language (XML) feeds, e.g., really simple syndication (RSS 2.0), resource description framework site summary (RSS 1.0 and RSS 0.90), rich site summary (RSS 0.91), and atom syndication format (Atom), as well as the externalization of Web application interactions in the form of application programming interface (APIs), has facilitated and accelerated programmable aspects of the Web. Most new Web sites and applications either expose data feeds or expose more advanced APIs such as representational state transfer (REST) services or atom publishing protocol (APP).

There are two paradigm shifts occurring on the Web that are changing the way software is developed. The first is the increasing availability of Web APIs or Web services in the form of REST, APP, and simple object access protocol (SOAP) services, as well as RSS and Atom data services. The proliferation of Web APIs has resulted in various composed services with user interfaces (UIs), or mashups, which provide solutions to problems, sometimes specific or relatively narrow problems. The second paradigm shift is a movement to Web applications using dynamic programming languages and frameworks, e.g., JavaScript™ with asynchronous JavaScript™ and XML (AJAX), Ruby with Ruby on Rails™ (RoR), and Smalltalk with Seaside.

SUMMARY OF THE INVENTION

Principles of the invention provide, for example, an environment for mashup creation through the reuse and combination of existing networking or Web applications, and a repository of networking or Web applications that may be reused, combined and deployed on a computing cloud resource. New applications created by mashup of existing applications may be deposited in the repository for further reuse and mashup creation. Principles of the invention further provide a domain specific language (DSL) providing mashups with a mostly declarative common structure and design, and facilitating sharing and reuse of mashup and mashup parts.

For example, in accordance with one aspect of the invention, a method is provided for forming a networked software application on a first computer resource coupled by a network to a client computer of a user. The method comprises the steps of accessing, within a repository that is part of the first computer resource, a first networked software application part, forming, within the first computer resource, a second networked software application part, and providing the second networked software application part to the repository. The second networked software application part comprises a first element of the first networked software application part. The steps of accessing, forming and providing are performed using the first computer resource comprising the repository. The first and the second networked software application parts remain on the first computer resource, and separate from the client computer, during the forming of the second networked software application part.

Aspects of the invention include, for example, facilitating Web 2.0 mashups, enabling a project to be deployed as a complete RoR Web application with all necessary service proxies, models, and initial views for each mashup, providing an efficient and principled approach to designing mashups, and for sharing mashups and mashup parts. Aspects also include, for example, facilitating mashup management to a computing cloud, user servers, or downloaded, within one or more files, to a computer resource for future deployments.

These and other features, objects and aspects of the present invention will become apparent from the following detailed description of illustrative embodiments thereof, which is to be read in connection with the accompanying drawings.

BRIEF DESCRIPTION OF THE DRAWINGS

FIG. 2A is a table of primary constructs of a DSL language according to an exemplary embodiment of the invention.

FIG. 2B is a continuation of the table shown in FIG. 2A according to an exemplary embodiment of the invention.

FIG. 5 illustrates a computer system in accordance with which one or more components/steps of the techniques of the invention may be implemented, according to an embodiment of the invention.

DETAILED DESCRIPTION OF THE INVENTION

Figure 1:
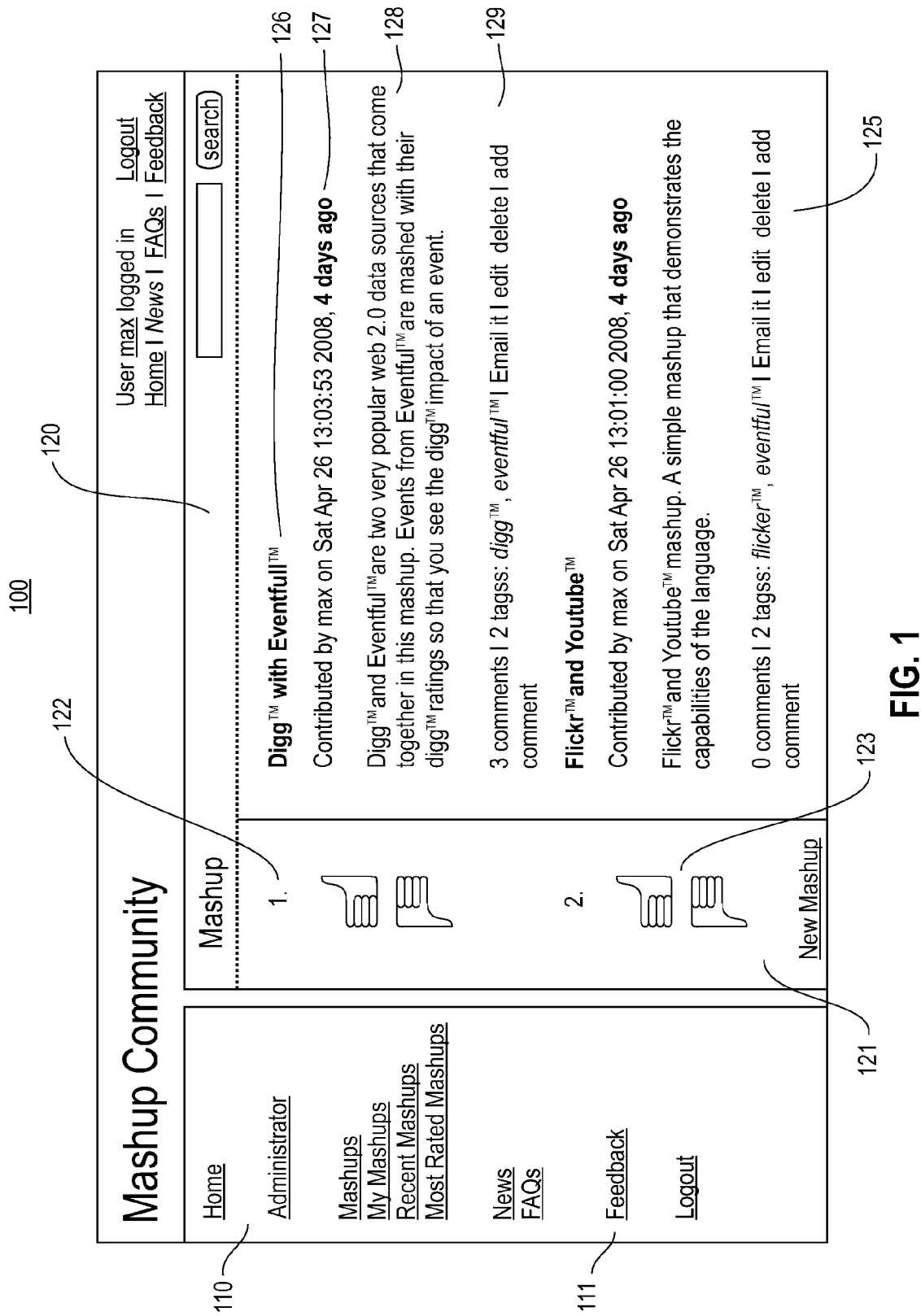
FIG. 1 shows a Web page view of a community application according to an exemplary embodiment of the invention.

An application programming interface (API) is a set of declarations of the functions or procedures that an operating system, library, service, or other entity provides to support requests made by computer programs, and to support data exchange between API users and the API itself.

Asynchronous JavaScript™ and XML (AJAX) is a group of inter-related Web development techniques used for creating interactive Web applications. A primary characteristic is the increased responsiveness of Web pages achieved by exchanging small amounts of data with the server "behind the scenes" so that entire Web pages do not have to be reloaded each time there is a need to fetch data from the server. For example, AJAX is intended to increase Web page's interactivity, speed, functionality and usability.

Atom Publishing Protocol (APP, AtomPub) is an HTTP-based protocol for creating and updating Web resources. The Atom Publishing Protocol exchanges data elements such that a list of elements is maintained on the server. Elements can be retrieved, added, modified, and deleted from the list.

Atom Syndication Format (Atom) is an XML language used for Web feeds.

Cloud or compute cloud, as used herein, is a computing resource. Cloud refers, for example, to computing resources that are accessed by consumers, and which are typically owned and operated by a third-party provider on a consolidated basis in one or more data center locations. Consumers of cloud computing services use computing capacity on-demand and are typically not concerned with the underlying technologies used to achieve increases in server capability. Services delivered from the cloud, in addition to Web applications, include, for example, storage, raw computing, and access to any number of specialized services. Examples of clouds include Amazon Elastic Compute Cloud (Amazon EC2™), Google™ File System (GFS), Google™ App Engine, and other computing resources accessible through networked software applications, for example, Web applications. Consumers of cloud computing may or may not have to pay for use of the cloud computer resources.

Domain specific language (DSL) is a language built on top of a hosting language. The DSL provides common syntax and semantics to represent concepts and behaviors in a particular domain. The term DSL indicates a programming language or specification language dedicated to a particular problem domain, a particular problem representation technique, and/or a particular solution technique. The term DSL is sometimes used in conjunction with domain-specific modeling. Domain-specific languages are considered, for example, fourth generation programming languages.

The Extensible Markup Language (XML) is a general-purpose specification for creating custom markup languages. It is classified as an extensible language because it allows its users to define their own elements. The primary purpose of XML is to facilitate the sharing of structured data across different information systems, particularly via the Internet, and XML is used both to encode documents and to serialize data.

Gem is a packaging file format and mechanism for Ruby and RoR applications. Gem files can contain all the necessary files and resources for a RoR Web application as well as dependencies listed in a manifest file. When a Gem file is installed the gem tool can fetch the dependencies over the Web thereby making a gem packaging of a RoR application self-contained.

JavaScript™ is a scripting language. JavaScript™ is used, for example, for client-side Web development. Although best known for use in Web sites (as client-side JavaScript™), JavaScript™ is also used to enable scripting access to objects embedded in other applications.

JavaScript™ Object Notation (JSON) is a data-interchange format. JSON is intended to be easy for people to read and write, and for machines to parse and generate. JSON is based on a subset of the JavaScript™ Programming Language (standard ECMA-262). JSON is a text format that is substantially language independent but uses conventions that are familiar to programmers of the C-family of languages. JSON is built on two structures: a collection of name/value pairs, and an ordered list of values. In various languages, the collection of name/value pairs is realized as an object, record, struct, dictionary, hash table, keyed list, or associative array. In most languages, the ordered list of values is realized as an array, vector, list, or sequence.

A mashup is a composition of multiple services (REST, APP, SOAP, RSS, or Atom) that contains information on how to represent the service API and data and how to combine the services and present a user interface. A mashup comprises a collection of mediates and wirings. A mashup can be further explained as a Web application that combines data from more than one source into a single integrated new Web application. An example of a mashup is the use of cartographic data from a map Web site to add location information to real estate data obtained from a real estate Web site, thereby creating a new and distinct Web service that was not originally provided by either Web source.

Mediate invokes a mediation declaration with instances of the data elements to mediate and to transform into one or more data elements.

Metaprogramming is the writing of computer programs that writes or manipulates other programs, or themselves, as their data. Metaprogramming often exposes the internals of the run-time engine to the programming code through APIs. The language in which the metaprogram is written is called the metalanguage. The language of the programs that are manipulated is called the object language. The ability of a programming language to be its own metalanguage is called reflection or reflexivity.

MySQL™ is a relational database management system which is widely used. The program typically runs as a server providing multi-user access to a number of databases.

Representational State Transfer (REST) is a style of software architecture for distributed hypermedia systems, for example, the Web. REST refers to, for example, a collection of network architecture principles which outline how resources are defined and addressed. REST is often used to describe an interface which transmits domain-specific data over hypertext transfer protocol (HTTP) without an additional messaging layer such as SOAP.

RHTML means Ruby code embedded within an HTML document.

RSS is a family of Web feed formats used to publish frequently updated content such as blog entries, news headlines, and podcasts in a standardized format. An RSS document, which is called, for example, a feed or Web feed, contains either a summary of content from an associated Web site or the full text. RSS makes it possible for people to keep up with Web sites, in an automated manner, which can be piped into special programs or filtered displays. The initials RSS are used to refer to the following formats: really Simple Syndication (RSS 2.0), Resource Description Framework (RDF) Site Summary (RSS 1.0 and RSS 0.90), and Rich Site Summary (RSS 0.91).

Ruby is a dynamic, reflective, general purpose object-oriented programming language. Ruby supports multiple programming paradigms, including functional, object oriented, imperative and reflection. Ruby also has a dynamic type system and automatic memory management. In an official implementation, written in C, Ruby is a single-pass interpreted language.

Ruby JavaScript™ (RJS) is JavaScript™ generated from RJS templates written in Ruby. RJS templates are a type of template added to Rails 1.1. RJS templates generate JavaScript™ code that is executed when it is returned to the browser. RJS JavaScript™ generation allows, for example, multiple page updates in-place without a page reload using Ajax.

Ruby on Rails™ is Web application framework designed to make Web development faster, simpler and more efficient. Often shortened to Rails, or RoR, Ruby on Rails™ is written in the Ruby programming language.

Semantics, with respect to programming, reflects the meaning of programs or functions. Semantics, for example, permits programs to be separated into a syntactical part and a semantic part.

Simple Object Access Protocol (SOAP) is a protocol for exchanging extensible markup language (XML) based messages over computer networks using, for example, HTTP and hypertext transfer protocol over secure socket layer (HTTPS). SOAP forms the foundation layer of the Web services protocol stack providing a basic messaging framework upon which abstract layers can be built.

Smalltalk is an object-oriented, dynamically typed, reflective programming language.

Seaside is a Web application framework, created in Smalltalk, for Web development.

Squeak is a programming language that is an implementation of Smalltalk. Squeak is derived directly from Smalltalk-80. Squeak is object-oriented, class-based, and reflective. Squeak is available for many platforms. Squeak programs produced on one platform typically run bit-identical on all other platforms. The Squeak system includes, for example, code for generating a new version of the virtual machine (VM) on which it runs. Squeak also typically includes a VM simulator written in Squeak. For this reason, it is typically easily ported.

A social network service is a service focused on building an online community of people who share interests or activities, or who are interested in exploring the interests and activities of others. Many social network services are Web based and provide a variety of ways for users to interact, such as email and instant messaging services. Examples of social networking services are Facebook™, MySpace™, Linkedin™, and Plaxo™. A social network service is offered and accessed through, for example, a social network service platform.

A Protocol mediation step constitutes one atomic step in protocol mediation. A protocol mediation step can be invoked multiple times as part of a protocol wiring. A protocol mediation step is invoked, for example, by the name of the protocol mediation step as a method call.

Syntax of a programming language is, but is not limited to, the set of rules that a sequence of characters in a source code file must follow to be considered as a syntactically conforming program in that language.

Unified/Universal Modeling Language (UML™) is a standardized visual specification language for object modeling. UML™ is a general-purpose modeling language that includes a graphical notation used to create an abstract model of a system, referred to as a UML™ model.

UML™2 is a newer implementation of the Unified Modeling Language specification.

The term Web, as used herein, has the same meaning as and is also known as the World Wide Web and the Internet. Web applications are networked software applications.

Web 2.0 is a term used to describe the trend in the use of Web technology and Web design that aims to enhance creativity, information sharing, and, most notably, collaboration among users. The concepts of the Web have led to the development and evolution of Web-based communities and hosted services, such as, for example, social-networking sites and blogs. Web 2.0 is also known as the social Web.

Wiring or service protocol mediations include two levels of granularities for connecting the services that are part of a mashup. The first level is protocol. Protocol is a top-level structure of a mashup. Protocol represents one or multiple operation wirings and protocol mediation steps invocations. The second level is operation. Operation is the wiring of one or multiple service operations. Operation wiring includes the ability to invoke service operations in a synchronous and/or an asynchronous fashion by automatically setting up callbacks.

Distributed computing and distributed programming has shifted from private networks to the Internet (Web) using heterogeneous Web application programming interfaces (API). The shift in distributed computing to the Web enables the creation of situational applications of composed services exposing user interfaces, i.e., mashups.

One of the consequences and manifestations of the programmable Web is the creation of new Web applications, known as mashups, which combines views, data, and logic from existing Web sites or applications to create a new application. Using the various available Web APIs, mashups exist that solve many types of problems, some are esoteric mashups, such as mashups knowing locations and availability of hard to find gaming consoles, some are narrowly focused mashup, such as mashups creating a Sudoku game from online photo service photos, and some are more generally useful mashups, such as mashups providing weather information and online mapping services.

While the many available mashups indicate a flourishing and innovative Web, the many available mashups also raise various new problems, challenges, and opportunities. One of the key issues, related to mashups, is that mashups are typically point solutions lacking principled approaches to architecture and design. Many similar mashups use the same APIs but share nothing else in common. Additionally, to accelerate innovation in the mashups space, just as the social features of Web 2.0 have fostered collaborative content creation, mashups could be built collaboratively, or at least parts of mashups could be shared, fostering additional mashup constructions.

Two cases illustrate the shift to a programmable Web. The first case is in the realm of Web 2.0, the social Web, where end-users are collaborating to create content and value. The second case is within the emerging move of Web 2.0 concepts into enterprise space, or what is called Enterprise 2.0. In both cases, the services involved in the mashups and the various components needed to create the mashup are described at a conceptual level.

In the first case, the Web 2.0 case, users contribute, comment on, tag, rank, and aggregate content, which is often exposed in the form of RSS or Atom feeds. Additionally, many current Web applications are making their business functions available as REST and SOAP services. Consider mashups between the following three Web 2.0 style services:

1. A news Web site with Atom feeds for syndicating news items most voted for by Web site users.

2. A photo sharing Web site comprising an application with a REST API to access photos contributed by users of the photo sharing Web site, as well as finding the tags that its community of users added for each photo.

3. An event database Web site with a collection of event information, e.g., theater shows, sporting events, and so on, and a REST API to search, find, add, and manage events. Additionally, each event can be tagged by the users.

A variety of mashups are possible. Consider the simple one that gives an interface to the end-user to find events based on location and keywords input, e.g., 'Silicon Valley' location and 'book signings' keywords. Using the events data returned from the Web site, as well as the tags and title information for each event, the end-user can find news items, from the Atom feed of the news Web site, being tagged with same keywords as well as the top photos, from the photo sharing Web site, also tagged with the same keywords. In other words, the mashup gives a simple, integrated, and automated view for the information of three different Web 2.0 services. Since the data and APIs are live, the information displayed is constantly updated.

In the second case, the enterprise case, mashups are also possible. For example, mashups are an efficient way to address idiosyncratic needs of employees and to help them innovate by creating Web based solutions to problems that might not warrant the expenditure of time and investment from the information technology division. Mashups typically provide solutions to repetitive tasks as well as solutions to unforeseen tasks and needs.

Consider a first enterprise case. Enterprise information technology is often slow to integrate and to migrate to newer technologies. Mashups, with their easy and purposeful Web interfaces, give an excellent venue to create applications that can support day-to-day activities for some specific recurring tasks. For instance, a common task, at a large and multi-location Research lab, is to update calendars with internal talks at various locations around the world, as well as from public external talks at local universities and organizations. A simple mashup could aggregate Atom feeds from various talk sources and give a common location to easily update a calendar of a researcher. This mashup could be integrated with other services to allow ranking of talks and presenters which would give some community feedback on attended talks.

For a second enterprise case, consider a company with a complex set of legacy Web services for order management and customer relationship management. While the company has been able to integrate with partners that have adopted its services and have participated in its partner program, the company has not attained other partners, for instance, a new partner that submits purchase orders using a new or different order purchasing system. To address the new order purchasing system of this new partner, the company could create a mashup that would mediate between the order purchasing system of the new partner and the legacy Web services. The mashup would transform messages of the order purchasing system of the new partner into a format that the legacy Web services could comprehend, would resolve the necessary choreographic conflicts between the order purchasing system of the new partner and the legacy Web services, and would provide the necessary order purchasing system of the new partner confirmation messages. A different mashup could be created for each new partner who comes with a different new order purchase system having different messaging vocabularies or proprietary formats.

The Web, as a programmable communications media, lacks unified models to facilitate mashup creation, reuse and deployment. Mashup creation, reuse and deployment can be facilitated, for example, by an online service platform for developing and sharing situational Web 2.0 applications and mashups.

An embodiment of the invention is an online mashup platform providing a principled approach to designing mashups and for sharing mashup parts as well as facilitating mashup management. For example, the platform motivates mashups as solutions to Web integration and service composition problems.

Another embodiment of the invention is a DSL and platform for services mashups. The DSL of the invention allows for a common interface representation among service types, gives a uniform model for service data and interactions of service operations, and provides a common high-level language for mashups. The DSL streamlines and structures the development of applications comprising Web APIs, and exposes the Web APIs. Mashup creation and reuse is enhanced by sharing and reuse of at least parts of the DSL of associated applications. The DSL and platform's implementation of the invention is demonstrated in an embodiment using Ruby and the RoR framework.

Embodiments of the invention extend the RoR architecture with a new DSL, supporting libraries, as well as associated platform models, services, and end-user applications. Using tools of the invention, application developers can create, edit, and deploy mashup projects containing the necessary information for describing the services to be combined or mashed as well as the mashup information. Deployments can be done to user computing servers or on a compute cloud, e.g., Amazon's EC2™. Application developers can also share these mashups for reuse and extensions. Aspects of the invention enable a project to be deployed as a complete RoR Web application with all necessary service proxies, models, and initial views for each mashup. An application developer typically uses tools of the invention to iterate over the mashups and to refine and customize the UI components enabling Web applications and mashups creation, sharing, deployment, and management.

A mashup is a new Web application that, for example, aggregates multiple Web APIs or Web content to achieve a new purpose. Typically, a mashup interfaces and interacts with users or people using the mashup. A mashup is used for repurposing existing Web resources, for example, content and APIs. A well-structured mashup includes, for example, at least three aspects of a well-designed Web application: models, views, and controllers. The well-structured mashup may have additional functionalities and variations. Because the different Web APIs used in a mashup typically comes from heterogeneous providers, there is usually a need to mediate between the different APIs in order to form the mashup. Therefore, for embodiments of the invention, forming a mashup from different Web APIs typically involves the following activities:

1. Data mediation: Data mediation involves converting, transforming, and combining the data elements from one API to meet the needs of the operations of another API. An example is determining the correct address data fields to invoke a mapping service and API.

2. Process (or protocol) mediation: Process (or protocol) mediation is the choreographing between the different APIs in order to create a new process or to present the necessary interactions to an end-user.

3. User interface customization: User interface customization provide an interface that is used to elicit user information as well as to display intermittent process information to the user. This interface can be relatively simple Web forms and static pages with dynamically generated content, or the interfaces can be richer AJAX interfaces that refresh content or dynamically generate new pages based on current user interactions.

An embodiment of the invention provides a language and a set of Web-based tools to facilitate the construction of well-structured mashups.

Other embodiments of the invention are implemented using the RoR framework, for example, a collection of RoR Web applications and Web APIs. While the DSL has a well defined grammar and could be implemented using a language other than the RoR framework, or implemented with its own parser, compiler, and code generation engine, the flexible syntax and dynamic features of Ruby and RoR are used to completely implement the DSL in Ruby and RoR.

The platform currently comprises three RoR applications. A core that implements the DSL engine is the centerpiece. The core contains facilities to take a complete mashup described in the DSL and generate necessary code for a complete mashup RoR Web application. The engine is exposed as Web APIs. The rest of the platform comprises of a creator application for creating the mashup, and a community application for sharing the mashup.

Users, i.e., application developers, create projects which can contain multiple mashups. The mashups follow the structure of the DSL of the invention. Tools and methods of the invention provides, for example, basic facilities to browse the DSLs, to create new DSL constructs via wizards, and to search and reuse DSL parts from other projects of current users or other users. After creating and testing a mashup, users can deploy mashups as packaged RoR Web applications, that is, as a gem, which can be downloaded and installed on servers belonging to the users or on a remote server. A requirement is that the server needs to have the RoR framework installed as well as a relational database, e.g., MySQL™ or DB2™ (an IBM™ relational database management system).

All other dependencies are either included in the application gem or are downloaded upon install from the Web.

An aspect of the invention is a mashup community. The mashup community has access to existing mashups and networked applications through, for example, a community application. The community application is, for example, a RoR Web application used to share already deployed mashups. An objective of the RoR Web application is to build a community of mashup developers or users and to create a catalog of mashups. Members of the community can discuss and rate the mashups. Mashups can be automatically added or deployed to an application deployment platform to become available to the community or mashups can be added manually by community members. FIG. 1 shows a Web page view 100 of a community application. The Web page view 100 of the community application comprises a link block 110 comprising links 111 to various other Web pages associated with the community application, for example, home, news, frequently asked questions (FAQs), feedback, administrator, and logout pages, as well as various mashup pages. The Web page view 100 of the community application further comprises a mashup block 120 comprising a first sub-block 121 and a second sub-block 125. The first sub-block comprises mashup numbers 122 for mashups listed and thumbs-up/thumbs-down voting link buttons 123. The voting link buttons allow users to vote on the quality or other attribute of the mashup. The second sub-block 125 comprises the mashup name 126, contributor information 127, mashup description 128, and associated links 129, for example, tags associated with the mashup.

As previously stated, a DSL is a language typically built on top of a hosting language. The DSL provides a common syntax and semantics to represent concepts and behaviors in a particular domain. Typically, using or designing a DSL helps achieve one or more of the following goals: abstraction, terse code, simple and natural syntax, ease of programming, and code generation Abstraction is achieved by enabling programming at a level higher than what is available with the host programming language constructs or libraries. A DSL allows the domain concepts, actions, and behaviors to be represented directly in the new syntax.

Terse code is a result of programming in a higher level of abstraction. DSL programs are typically smaller than their equivalent in general purpose programming languages.

Simple and natural syntax leads to code that is relatively easy to write and read.

Ease of programming is usually achieved because a DSL enables the expression of constructs that map directly to a domain. DSL generally makes programming easier, for applications in the domain, than when using the underlying language directly.

Code generation is an aspect of how DSL typically functions. The DSL statements are translated at runtime into code that uses the underlying language and its libraries. This can be either using meta-programming techniques or actual generation of program files.

The features of the DSL language map to the various top-level constructs from the conceptual definition and the conceptual model for mashup presented above. A mashup is typically a composition of services (REST, APP, SOAP, RSS, or Atom) containing information on how to represent the service API and data, how to combine the services and data, and how to present a user interface. Because a mashup represents new data or functionality not originally intended by the service provider, the invention explicitly represents, in the DSL language, some of the activities that a mashup designer needs to do. The primary constructs of the DSL language of the invention, along with examples are presented in the tables 200A and 200B shown in FIG. 2A and FIG. 2B. The tables 200A and 200B comprise the names of the primary constructs listed in construct column 210, the description of the primary construct listed in the description column 220, and examples of use of the primary constructs in example column 230.

UML™ or UML™2 class diagrams (static structure) models can be used to represent the DSL language including the constructs of the DSL language. In such a UML™ or UML™2 model, the UML™ boxes do not have to translate to classes in the underlying language, although they could.

The DSL Language of the invention includes, for example, primitives for:

1. Defining the data and API of the service and enabling a uniform model and representation of various types of services.

2. Data mediation, which represents data manipulations, for example, conversions, transformations, and combinations.

3. Service protocol mediation, or wiring, which specifies the choreography of the services.

The mashup DSL directly represents in the syntax necessary to cover the three main components of the conceptual models for mashups: (1) data and mediation; (2) service APIs, service API protocols, and service API choreography; and (3) a means to create customized UIs for the resulting mashups. Views are added by generating and tailoring RoR RHTML templates. In one embodiment, the DSL language of the invention comprises:

data describing a data element used in a service. A data element can correspond to an XML schema complex type, a JavaScript™ Object Notation (JSON) complex type, or other data serialization formats or mechanisms.

API giving a complete description interface of the service, including operation names, parameters, and data types.

mediation describing the transformation of one or multiple data elements to create a new data element.

service binding for a service API with a concrete service by indicating the type of service and the network endpoint Uniform Resource Locator (URL).

recipe constituting a collection of services and mashups. A recipe also includes views for each of the mashup wiring. Some views are automatically generated and others are customized by the user or application developer.

desc provides a short English descriptions for constructs. desc enables searching.

tag and tags allowing users to annotate the various constructs.

The DSL of the invention enables mashup programming at a higher-level of abstraction than frameworks supporting Web application programming. With the DSL of the invention, the main activities that a mashup programmer needs to address, as specified in conceptual model of the invention, can be explicitly represented. Uniform design for mashups and integration into RoR is supported, thus enabling adding rich Web views including AJAX views.

Aspects of the invention have been evaluated by analyzing the code generated from the invention for three simple mashups of different Web API types. The three types of mashups are a REST/AtomPub mashup, a RSS/Atom mashup, and a REST/REST mashup. Using the invention, programmers are able to not only create a common reusable representation for mashups, but also to shorten development time.

An embodiment of the invention is a platform providing Web based tools. A mashup creator tool is an example. The mashup creator tool contains various wizards to facilitate the generation of the various DSL constructs. Using the mashup creator tool, the various DSL constructs (including api, data, and service) can be generated for an Atom feed by simply loading the feed and selecting Atom entry data fields that are needed in the data declaration.

Mashups of the invention are more than data feeds combination, and provide solutions that include process choreography as well as user interfaces.

Aspects of the invention expose the language for a mashup, and have the ability to export the resulting mashup in a packaged form that can be deployed to other servers, or deployed to cloud computing resources and services. Aspects of the invention address the service mashup construction but not necessarily the entire model view controller (MVC) stack. RoR is used to enable the MVC stack. Aspects of the invention use metaprogramming to compile language constructs into RoR code which makes this aspect dynamic. Support of views is achieved using RoR views, which is done using HTML and JavaScript™ templating languages, e.g., RHTML and RJS.

Although RoR is the Web application framework used in many embodiments of the invention, embodiments of the invention can be supported by alternate Web application frameworks, for example, the invention can be supported by the Smalltalk Seaside 7 platform, language and framework, and by the Seaside related Squeak programming language. Like RoR, Seaside provides a complete framework for creating Web applications. The framework also contains tooling to allow users to browse, edit, and modify the code, directly within a Web browser, for resulting Web applications.

Additional features of the invention are RoR generators and plug-ins to facilitate command line generation of the DSL recipe and its different components. These features facilitate RoR programmers to adopt the DSL of the invention into applications and also to contribute back to the RoR community.

Management of mashups is also provided. A few of the reasons for creating mashups are to provide innovative solutions to business problems and to enable solutions to be present in various places on the Web. Thus, it is useful to facilitate mashups to grow into full blown Web applications. Aspects of the invention that provide tooling to facilitate scalable deployments of resulting mashups as well as automatic caching of the data components, facilitate making solutions of the invention ready for wide-scale availability, for example, allowing mashups to be automatically deployed to compute clouds such as Amazon's EC2™ and Google™ App Engine 10. Furthermore, using cloud computing intermediaries such as MorphExchange 11 and Hekoku 12 can automate the cloud deployment process and facilitate mashups to automatically scale as more users access them.

The invention allows mashups to be deployed in social utility platforms or social networking service platforms such as Facebook™ and OpenSocial™. These platforms allow Web applications to integrate and blend into social networking sites. Allowing mashups of the invention to be deployed as social applications gives a rich platform and user community for resulting mashups, and allow their usages to become widespread. Additionally, such social platforms provide various facilities that mashup designers could be allowed, through aspects of the invention, to include in mashups. An example is member information provided, by the Facebook™ platform, which includes social graphs of the members, where the social graphs represent, for example, social interrelationships of the members. Another example is the facility in the Facebook™ platform that allows easy means to invite friends of the user to partake in social activities and allows easy notification of these activities and actions.

Figure 3:
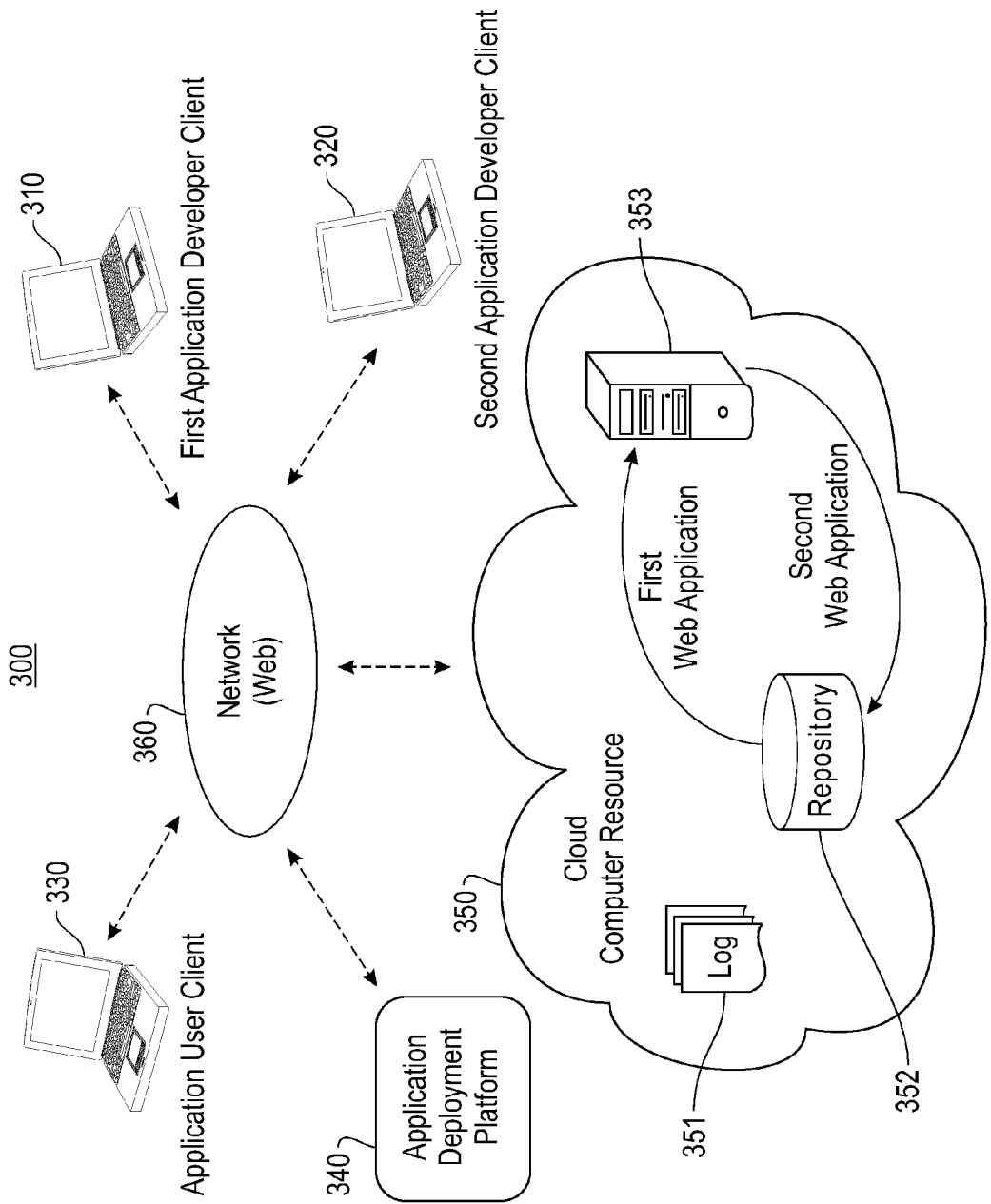
FIG. 3 illustrates a system for developing networked applications, Web applications and mashups according to an exemplary embodiment of the invention.
Figure 4:
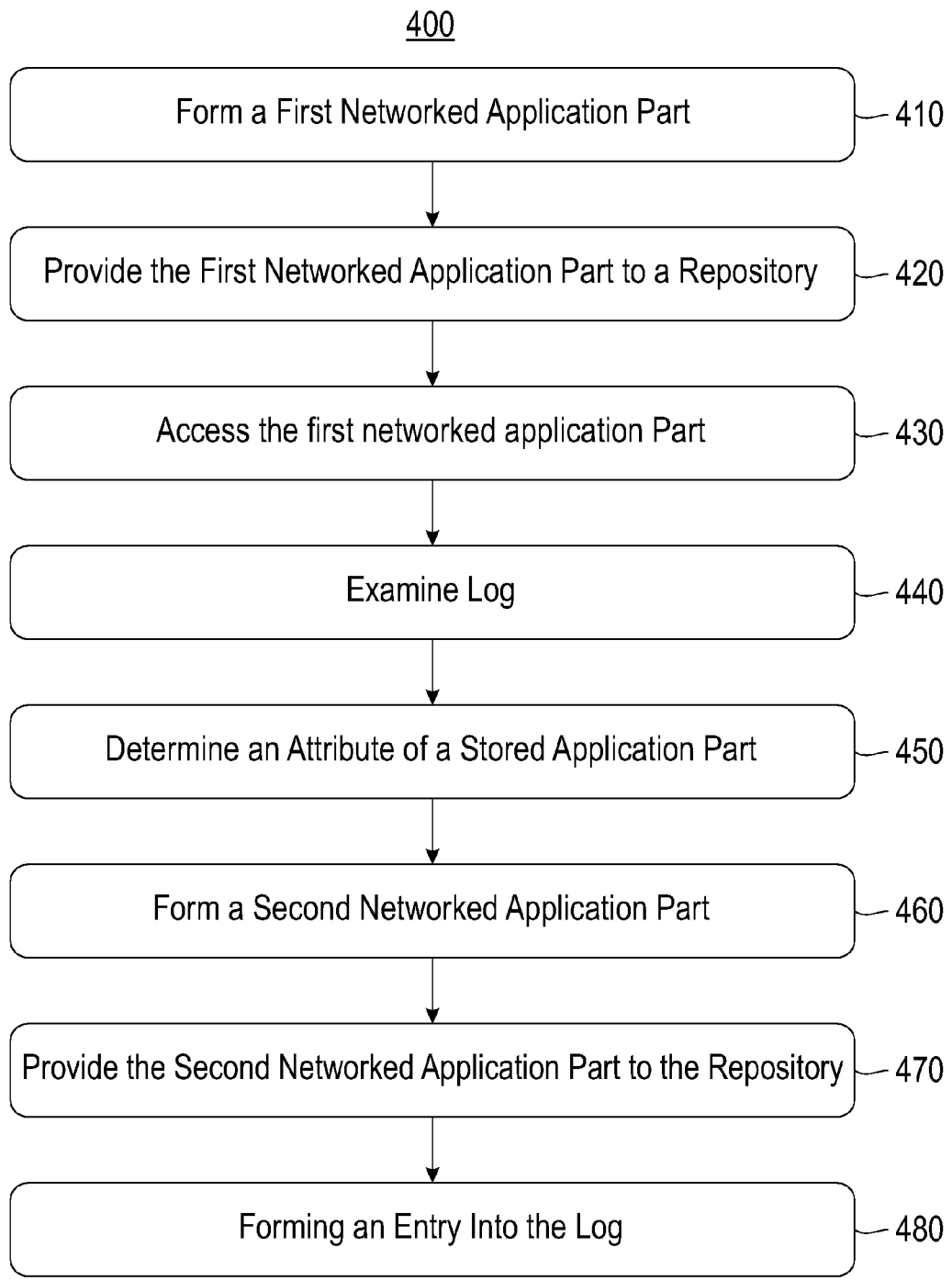
FIG. 4 illustrates a method for forming a networked or Web application and mashups according to an exemplary embodiment of the invention.

A system 300 illustrated in FIG. 3 and a method 400 shown in FIG. 4 are embodiments of the invention enabling, for example, streamlined and efficient mashup creation, reuse and deployment.

FIG. 3 illustrates the system 300 for developing networked or Web applications, for example, mashups, according to an embodiment of the invention. The system 300 comprises a cloud computer resource 350 comprising a repository 352, a cloud server 353, and a log 351. The repository 352 stores networked or networked applications. The cloud server 353 provides general computing functions for the cloud computer resource 350, for example, accessing the repository 352 and log 351, providing computing resources to users, providing networked applications, and forming networked applications. The log 351 contains entries descriptive of networked applications stored within the repository 352, for example, an activity entry that indicates how often or when a networked application was accessed, a tag, and a comment. A tag can indicate an attribute of a networked application, such as size, owner, and type of application. Entries into the log 352 can be made by application developers and users.

The system 300 further comprises an application deployment platform 340. The application deployment platform 340 is an application computing resource that runs networked applications. An example of an application deployment platform 340 is a deployment platform associated with a social network service such as Facebook™, MySpace™, Linkedin™, and Plaxo™.

The system 300 further comprises clients of users, for example a first application developer client 310, a second application developer client 320, and an application user client 330. A client is a computing resource associated with a user, for example, the computing resource that a user utilizes to interface with a network such as the Web.

Lastly, the system 300 further comprises a network 360 for interconnecting, for example, clients 310, 320 and 330, the cloud computer resource 350 and the application deployment platform 340.

FIG. 4 illustrates the method 400 for forming a networked or Web application, or a mashup according to an embodiment of the invention. Although a flow diagram is shown, with steps shown in a particular order, the steps may occur in orders other than the order that is shown. In general, examples of a networked application part are a networked application, a portion of the networked application, and an application programming interface associated with the networked application.

The first step 410 is to form a first networked application part. Examples of a first networked application parts are a first networked application, a portion of the first networked application, and a first application programming interface. An example of the first networked application is a first Web application, such as, Google™ maps. The first networked application part may be developed, for example, by a first application developer associated with the first application developer client 310.

The second step 420 is to provide the first networked application part to the repository 352 which stores the first networked application part. The repository 352 also provides, typically, through the cloud server 352, the first networked application part to other application developers, for example, the second application developer associated with the second application developer client 320. The repository 352 may also provide, typically, through the cloud server 352, the first networked application part to application users, for example, the application user associated with the user client 330. Alternately, application users may obtain the networked application parts from the application deployment platform 340.

The third step 430 is to access the first networked application part. The first networked application part is accessed or obtained from the repository 352. In an embodiment of the invention, the second application developer, through the second application developer client 320, accesses the first networked application part. In this embodiment, during the formation of the second networked application part, the second application developer does not download the first or the second networked application part to the second application developer client 320. The second application developer accesses the first networked application part, modifies the first networked application part, forms the second networked application part, and provides, to the repository 352, the second networked application part using the cloud computer resource 350, and with the first and second networked application parts residing within the cloud computer resource 350. The second application developer client 320 is an interface between the second application developer and the cloud computer resource 350. In other embodiments, the second application developer does download the first networked application part.

Some aspects of forming the second application part on the cloud computer resource 350 are, for example: eliminating download time for downloading the first application part from the cloud computer resource 350 to the second application developer client 320; eliminating upload time for uploading the second networked application part from the second application developer client 320 to the cloud computer resource 350; providing the domain specific language and access to the domain specific language to the second application developer and client 320 in a controlled, secure and regulated manor; maintaining security and control of software and information that may be, for example, proprietary, for example, the domain specific language, certain APIs and certain data; and enabling business transactions, for example, fees for creating mashups on the cloud computer resource 350. Furthermore, mashup creation through a community resource for a community of mashup developers is enabled and fostered.

The fourth step 440 is to examine the log 351, and the fifth step 352 is to determine an attribute of a networked application part, for example, the first networked application part. The fourth step 450 and the fifth step 450 are optional steps. An application developer may examine entries within the log 351, for example, to determine or ascertain attributes of networked application parts, to sort networked application parts, to search networked application parts, and to help find networked application parts. For example, the second application developer may examine the log 352 to find an appropriate networked application part to modify to form the second networked application part. The attributes may be, for example, an activity entry, a tag, or a comment.

Using the log 351, developers and users can, for example, replay different activities of their peers to see, for example, how a networked application part has evolved or when a problem was fixed with a networked application part. Using the log 351, developers, users, or teams of developers or users can, for example, perform peer review of networked application parts. A developer accessing or replaying a log of his/her own is a means to achieve self-review of the networked application parts that the developer has created. Self-review and peer review, by submitting entries into and/or accessing the log, improve the quality of networked application parts or Web application development activities.

The sixth step 460 is to form a second networked application part. Examples of a second networked application parts are a second networked application, a portion of the second networked application, and a second application programming interface. An example of the second networked application is a second Web application, such as a Web-based real estate listing display that includes real estate listings and Google™ maps with directions to real estate listings. The second networked application part may be developed by the second application developer associated with the second application developer client 320. The second networked application part comprises a first aspect of the first networked application part. The second networked application part may be formed, for example, by editing the first networked application part. The first aspect comprises, for example, views, data, logic or services of the first networked application part. As previously mentioned, the second application developer does not need to download the first networked application part to the second application developer client 320, but is able to form the second networked application part as the first networked application part is residing within the cloud computer resource 350. The second networked application part may be formed, in part, by programming in a domain specific language. The domain addressed by the domain specific language comprises forming a networked services mashup.

The seventh step 470 is to provide the second networked application part to the repository 352 which stores the second networked application part. The repository 352 also provides, typically through the cloud server 352, networked application parts, for example, the second networked application part to other application developers, for example, a third application developer who may form a third networked application part based upon, or using aspects of, the second networked application part.

The eighth and last step 480 is to form an entry into the log 351. The eighth step 480 is an optional step. For example, the second application developer may form an entry into the log 351 to describe attributes of the first or second networked application part. As another example, a user may form an entry into the log 351 descriptive of the first or second networked application part, or any other networked application part. For an additional example, the log may be automatically updated to indicate the number of accesses to a networked application part. The cloud server 353 may be adapted to automatically update the log 351. The log entry may comprise, for example, an activity entry, a tag, or a comment.

The method 400 for forming a networked application is most useful when employed many times to build up a library of networked applications in repository 351. In an embodiment of the invention method 400 is used in a first cycle to form a second networked application part using a first networked application part. In this embodiment, method 400 is reused in a second cycle to form a third networked application part form the second networked application part, wherein, in the second cycle, the first networked application part is the second networked application part of the first cycle. In other embodiments, method 400 is repeated in additional cycles to form more derivative networked application parts. Furthermore there may be a plurality of distinct first networked application parts, leading to families of derivative networked application parts.

FIG. 5 illustrates a computer system 500 in accordance with which one or more components/steps of the techniques of the invention may be implemented. In an embodiment of the invention, the computer system 500 comprises at least part of the system 300 for developing networked applications, for example, the cloud computer resource 350 of FIG. 3. In another embodiment, the computer system 500 is adapted to execute at least part of a method of the invention, for example, at least part of the method of forming a networked application illustrated in FIG. 4. It is to be further understood that the individual components/steps of the invention may be implemented on one such computer system or on more than one such computer system. In the case of an implementation on a distributed computing system, the distributed computer system may comprise one or more computer systems implementing aspects of the invention. The individual computer systems and/or devices may be connected via a suitable network, e.g., the Internet or World Wide Web. However, the system may be realized via private or local networks. In any case, the invention is not limited to any particular network. Thus, the computer system shown in FIG. 5 may represent one or more servers, or one or more other processing devices capable of providing all or portions of the functions described herein.

The computer system may generally include a processor unit 505, memory 510, input/output (I/O) devices 515, and network interface 520, coupled via a computer bus 525 or alternate connection arrangement.

It is to be appreciated that the term "processor unit" as used herein is intended to include any processing device, such as, for example, one that includes a central processing unit (CPU) and/or other processing circuitry. It is also to be understood that the term "processor unit" may refer to more than one processing device and that various elements associated with a processing device may be shared by other processing devices.

The term "memory" as used herein is intended to include memory associated with a processor or CPU, such as, for example, random access memory (RAM), read only memory (ROM), a fixed memory device (e.g., hard disk drive), a removable memory device (e.g., diskette, compact disk, digital video disk or flash memory module), flash memory, non-volatile memory, etc. The memory may be considered a computer readable storage medium.

In addition, the phrase "input/output devices" or "I/O devices" as used herein is intended to include, for example, one or more input devices (e.g., keyboard, mouse, camera, etc.) for entering data to the processing unit, and/or one or more output devices (e.g., display, etc.) for presenting results associated with the processing unit.

Still further, the phrase "network interface" as used herein is intended to include, for example, one or more transceivers to permit the computer system to communicate with another computer system via an appropriate communications protocol.

Accordingly, application components including instructions or code for performing the methodologies described herein may be stored in one or more of the associated memory devices (e.g., ROM, fixed or removable memory) and, when ready to be utilized, loaded in part or in whole (e.g., into RAM) and executed by a CPU.

In any case, it is to be appreciated that the techniques of the invention, described herein and shown in the appended figures, may be implemented in various forms of hardware, application, or combinations thereof, e.g., one or more operatively programmed general purpose digital computers with associated memory, implementation-specific integrated circuit(s), functional circuitry, etc. Given the techniques of the invention provided herein, one of ordinary skill in the art will be able to contemplate other implementations of the techniques of the invention.

Although illustrative embodiments of the invention have been described herein with reference to the accompanying drawings, it is to be understood that the invention is not limited to those precise embodiments, and that various other changes and modifications may be made therein by one skilled in the art without departing from the scope of the appended claims.

What is claimed is:

1. A method for forming a networked software application, the method comprising the steps of:
   accessing, within a repository that is part of a cloud computer resource, a first networked software application part;
   forming, within the cloud computer resource, a second networked software application part, wherein the second networked software application part comprises a first element of the first networked software application part; and
   providing the second networked software application part to the repository,
   wherein the steps of accessing, forming and providing are performed within the cloud computer resource by the user client computer remotely accessing and using the cloud computer resource and repository through an application programming interface to form the networked software application on the cloud computer resource, and wherein the first and the second networked software application parts remain on the cloud computer resource, and separate from the client computer, during the forming of the second networked software application part.

2. The method of claim 1 further comprising the steps of:
   forming the first networked software application part; and
   providing the first networked software application part to the repository.

3. The method of claim 1 further comprising the step of:
   examining a log, wherein the log comprises at least one of a past activity entry, a tag, and a comment pertaining to the first networked software application part.

4. The method of claim 1 further comprising the step of:
   forming an entry into a log, wherein the entry comprises at least one of an activity entry, a tag, and a comment pertaining to at least one of the first networked software application part and the second networked software application part.

5. The method of claim 1 further comprising the step of:
   programming in a domain specific language to form the second networked software application part.

6. The method of claim 1, wherein the first element comprises at least one of first views, first data, first logic and first services.

7. The method of claim 1, wherein the second networked software application part has at least one of the following advantages over the first networked software application part: is more used, has a greater economic impact, comprises more features, and is more code efficient.

8. The method of claim 1, wherein the networked software application comprises a Web application.

9. The method of claim 1, wherein the step of the forming of the second networked software application part comprises editing the first networked software application part.

10. The method of claim 1, wherein the second networked software application is at least one of: i) deployed within a social network service platform, and ii) downloaded to a second computer resource as at least one file adapted to deployment at a later time.

11. The method of claim 1, wherein the second networked software application is automatically deployed to at least one of an application deployment platform, a compute cloud, and a social network service platform.

12. The method of claim 1, wherein the first networked software application part comprises a first application programming interface, and wherein the second networked software application part comprises a second application programming interface.

13. The method of claim 3, wherein the log is searchable, wherein the log comprises log entries of activities performed in the step of forming the second networked software application part, and wherein the log is adapted to inform how many times the first networked software application part is accessed.

14. The method of claim 5, wherein the domain specific language generates code of a hosting language, wherein the domain specific language provides a syntax and semantics to represent concepts and behaviors in a domain of the domain specific language, and wherein the domain specific language comprises at least one primitives operative to perform at least one of the following: define data of a service, define an application programming interface of the service, enable representation of types of services, perform data mediation, and perform service protocol mediation.

15. The method of claim 5, wherein the domain specific language comprises at least one of the following constructs: data, api, service, mashup, mediation, wiring, protocol mediation step, view, css, recipe, desc, tag, and tags.

16. The method of claim 14, wherein data mediation comprises at least one of converting, transforming, and combining the data elements from a first application programming interface to a second application programming interface, and wherein service protocol mediation comprises forming a new service protocol from a third and a fourth application program interface.

17. An article of manufacture for forming a networked software application, the article comprising a computer readable storage medium having one or more programs embodied therewith, wherein the one or more programs, when executed by a computer, perform the steps of:
  accessing, within a repository that is part of a cloud computer resource, a first networked software application part;
  forming, within the cloud computer resource, a second networked software application part, wherein the second networked software application part comprises a first element of the first networked software application part; and
  providing the second networked software application part to the repository,
  wherein the steps of accessing, forming and providing are performed within the cloud computer resource by a user client computer remotely accessing and using the cloud computer resource and repository through an application programming interface to form the networked software application on the cloud computer resource, and wherein the first and the second networked software application parts remain on the cloud computer resource, and separate from a client computer coupled by a network to the cloud computer resource, during the forming of the second networked software application part.

18. The article of manufacture of claim 17, wherein the one or more programs, when executed by the computer, perform the additional steps of:
  forming the first networked software application part; and
  providing the first networked software application part to the repository.

19. The article of manufacture of claim 17, wherein the one or more programs, when executed by the computer, perform the additional steps of:
  executing a domain specific language program to form the second networked software application part.

20. A cloud computer resource for forming a networked software application, the computer resource comprising:
  a memory storing program instructions; and
  a processor coupled to the memory and configured to execute the stored program instructions to:
  access, within a repository that is part of the cloud computer resource, a first networked software application part;
  form, within the cloud computer resource, a second networked software application part, wherein the second networked software application part comprises a first element of the first networked software application part; and
  provide the second networked software application part to the repository,
  wherein accessing of the repository, forming of the second networked software application and providing of the second networked software application are performed within the cloud computer resource by a user client computer, which is coupled by a network to the cloud computer resource, using an application programing interface to remotely access and use the cloud computer resource and repository to form the networked software application of the cloud computer resource, and wherein the first and the second networked software application parts remain on the cloud computer resource, and separate from the user client computer, during the forming of the second networked software application part.

21. The computer resource of claim 20, wherein the processor coupled to the memory is further configured to:
  form the first networked software application part; and
  provide the first networked software application part to the repository.

22. The computer resource of claim 20, wherein the processor coupled to the memory is further configured to:
  execute a domain specific language program to form the second networked software application part.

23. A method for forming networked software applications on a cloud computer resource coupled by a network to a client computer of a first user, the method comprising the steps of:
  accessing a repository comprising a plurality of networked software application parts and a searchable log, wherein the repository and searchable log reside within the cloud computer resource, wherein the plurality of networked software application parts comprises a first networked software application part, wherein the first networked software application part is adapted to modification to form a second networked software application part, wherein the searchable log comprises activities performed by users in creating the plurality of networked software application parts, and wherein the log is available to the users and to the first user to ascertain which of the plurality of networked software application parts have been more often used, by the users, in developing the plurality of networked software application parts;

modifying, within the cloud computer resource, the first networked software application part to form the second networked software application part; and making available, to the users and to the first user, the second networked software application part, wherein the second networked software application part is made available by depositing the second networked software application part into the repository, wherein the users and the first user are permitted to access and modify the second networked software application part to form at least one additional networked software application part, wherein the steps of accessing, modifying and making available are performed within the cloud computer resource by the user client computer remotely accessing and using the cloud computer resource and repository and searchable log through an application programming interface to form a networked software application on the cloud computer resource, and wherein the first and the second networked software application parts remain on the cloud computer resource, and separate from the client computer, during the modifying of the first networked software application part to form the second networked software application.

24. The method of claim 23, wherein the method is iteratively applied to form at least one additional networked software application parts, the method further comprising the steps of:

modifying the second networked software application part to form the at least one additional networked software application part; and making available, to users, the at least one additional networked software application part, wherein the at least one additional networked software application part is made available by depositing the at least one additional networked software application part into the depository, and wherein the users are permitted to access and modify the at one additional networked software application part to form at least one further additional networked software application part.

* * * * *